May 1, 1928.  
G. B. MOORE ET AL  
CASKET TRUCK  
Filed Oct. 9, 1925
1,668,282
2 Sheets-Sheet 1
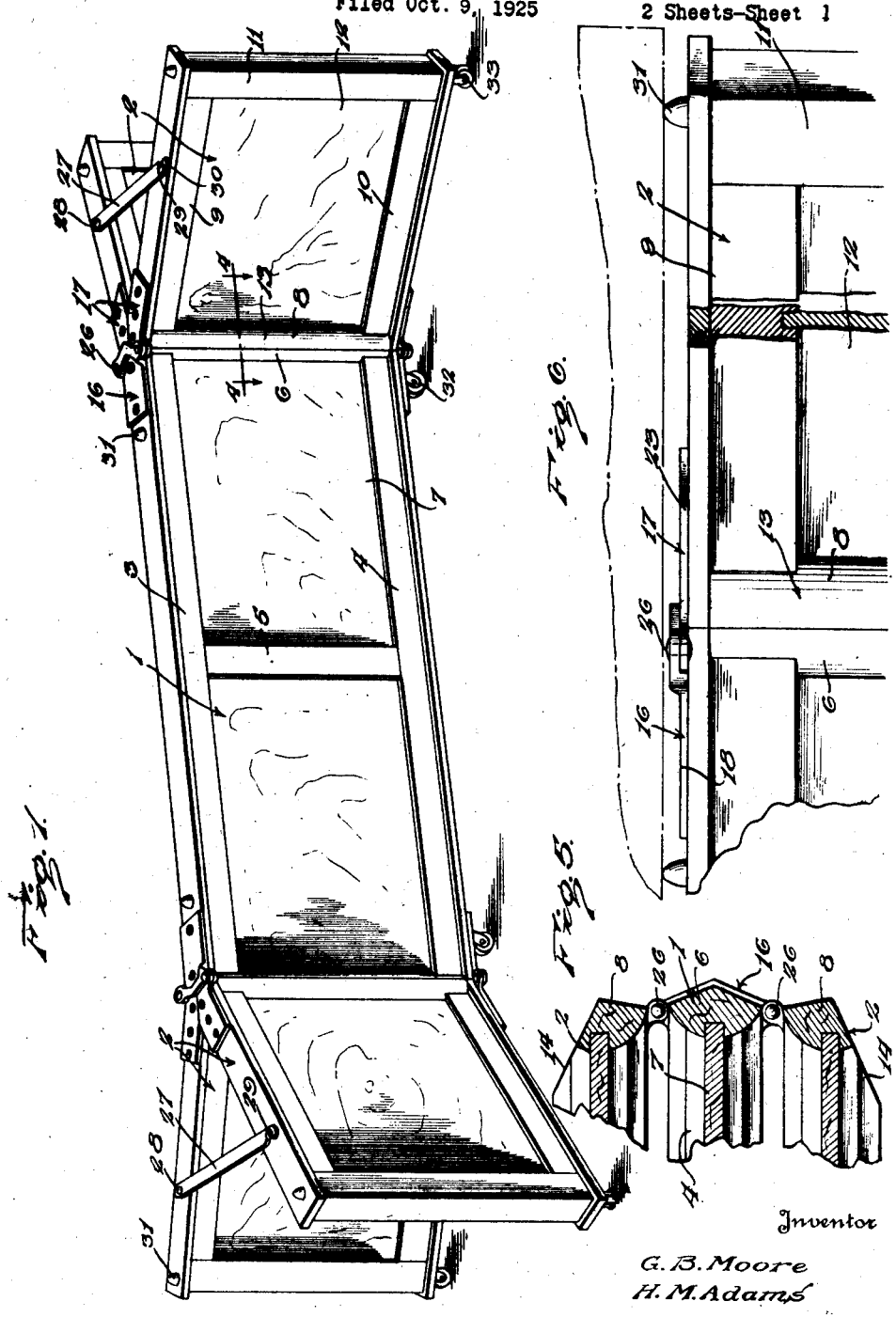
Inventor  
G. B. Moore  
H. M. Adams  
By *Lacy & Lacy*, Attorneys May 1, 1928.
G. B. MOORE ET AL
1,668,282
CASKET TRUCK
Filed Oct. 9, 1925
2 Sheets-Sheet 2
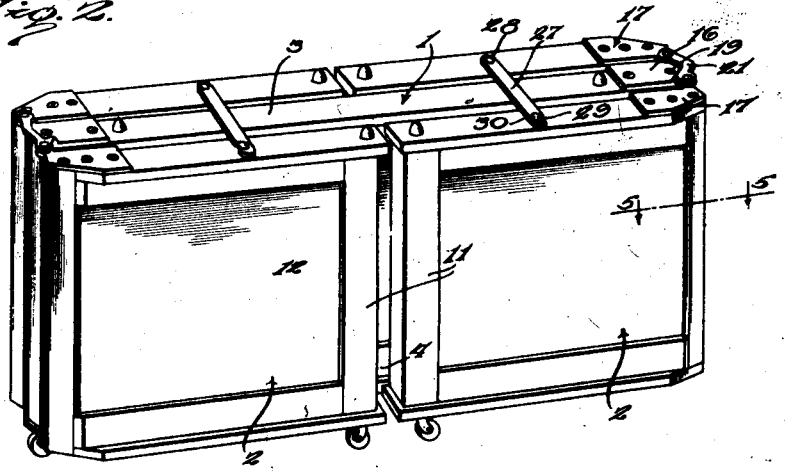
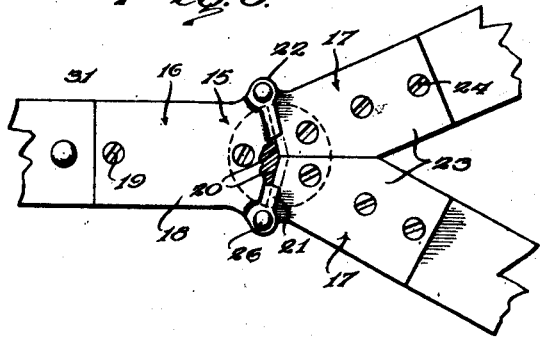
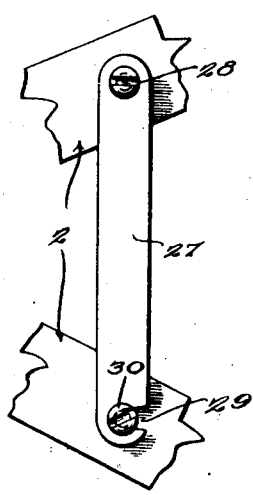
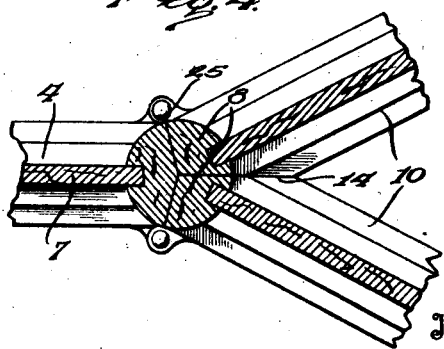
Inventor
G. B. Moore
H. M. Adams
By
Lacey & Lacey, Attorneys Patented May 1, 1928.

1,668,282

UNITED STATES PATENT OFFICE.

GEORGE B. MOORE, OF TIFFIN, AND HERALD M. ADAMS, OF BLOOMDALE, OHIO.

CASKET TRUCK.

Application filed October 9, 1925. Serial No. 61,548.

This invention relates to improvements in casket trucks and has as one of its objects to provide a truck which will be substantial and, therefore adapted to support caskets in a firm and secure manner, and which truck will, at the same time, be inconspicuous so far as any mechanical details of structure are concerned, and will, at the same time, present a neat appearance appropriate to the occasion under which it will be employed.

Another object of the invention is to provide a casket truck which may be conveniently folded into compact form when not in use and when being carried from place to place, and which may be readily set up by the mere unfolding of certain of its component parts, and, when set up, will not be liable to collapse or in any way fail to serve its purpose.

Another object of the invention is to so construct the truck that a single means will serve to maintain the parts in set up position and likewise maintain or secure them in their folded or collapsed condition, this means being wholly concealed when the truck is in actual use and a casket is supported thereon.

The truck embodying the invention comprises a main section and a pair of end sections swingingly mounted at each end of the main section and adapted, when the structure is set up for use, to extend in diverging planes from the respective ends of the main section and, when the structure is collapsed, to occupy positions lying at opposite sides of said main section, and the invention contemplates novel hinge connection for the several sections providing for their ready and uniform adjustment and, likewise, upright members having the semblance of columns of cylindrical form, at the ends of the main section and at the juncture of the end sections therewith, which uprights will be made in segments which will match to provide a smooth clyindrical column when the structure is set up for use, so that while the structure is light in weight, it has a more or less massive appearance.

In the accompanying drawings:

Figure 1 is a perspective view of the casket truck embodying the invention, the truck being set up for use.

Figure 2 is a similar view illustrating the truck collapsed or folded.

Figure 3 is a plan view in detail, partly in section, and illustrating the hinge connection provided between the main and end sections of the truck.

Figure 4 is a horizontal sectional view taken substantially on the line 4—4 of Figure 1, looking in the direction indicated by the arrows.

Figure 5 is a similar view, taken substantially on the line 5—5 of Figure 2, looking in the direction indicated by the arrows.

Figure 6 is a detail side elevation of one upper corner of the structure.

Figure 7 is a detail plan view illustrating the means provided for holding the sections in positon.

The truck embodyng the invention consists essentially of a main section indicated in general by the numeral 1, and two pairs of end sections indicated in general by the numeral 2. The section 1 comprises upper and lower rails indicated respectively by the numerals 3 and 4, a stile 5 which extends perpendicularly between the rails, between the ends thereof, and column sections 6 which extend perpendicularly between the ends of the rails 3 and 4, panels 7 being arranged within the frame structure comprising these parts so as to complete the section. It will be understood at this point, that any desired number of panels may be provided and may be arranged in any desired manner.

Each of the end sections 2 comprises a column section 8, upper and lower rails 9 and 10, a column 11 which extends perpendicularly between the outer ends of the rails 9 and 10, and a panel 12 which is arranged within the rectangular frame thus provided. Likewise, in this instance, as in the case of the section 1, any desired arrangement of the panels may be employed. The columns which comprise the sections 6 and 8 and which columns are indicated in general by the reference numeral 13, are of symmetrical form and in the present illustrated embodiment of the invention are cylindrical. The sections 1 and 2 are so assembled and connected, as will presently be specifically described, that when the structure is set up for use, the sections 2 comprising each pair will extend in diverging planes from the respective ends of the section 1 and, when the structure is collapsed, the said sections will lie against opposite sides of the said section 1, at the respective ends of the section. In the set up condition of the structure, the sections 6 and 8 comprising each column 13, will match to compose a symmetrical column, and with this end in view, the sections are of segmental form in horizontal cross section, the section 6 being preferably in the form of a segment of one hundred and fifty degrees, and each of the sections 8 being in the form of a segment of one hundred and five degrees, the plane relatively adjacent faces of the sections 8 being designed to abut flat against the relatively adjacent plane faces of the section 6 when the structure is set up for use, and the relatively remote faces of the sections 8 being designed, at such time, to mutually abut, as clearly shown in Figure 4 of the drawings. In order that the sections 1 and 2 may be so connected as to provide for adjustment of the sections 2 with respect to the section 1, in the manner above pointed out, a novel form of hinge is provided and will now be specifically described.

It will be observed by reference to Figures 3 and 4 of the drawings, that the ends of the rails 9 and 10 of the sections 2 are beveled, as indicated by the numeral 14, so that their beveled faces will mutually abut when the structure is set up in the manner shown in Figure 4, and it will also be understood that the ends of the rails 3 and 4 of the section 1 are likewise beveled. As all of the hinges are of counterpart construction, a specific description of one hinge will suffice for all. Each of the hinges, indicated in general by the numeral 15, comprises a member 16 to be secured to the rail 3 or the rail 4 of the section 1, as the case may be, and a pair of members 17 which are secured to the rail 9 or rail 10 of the respective pairs of end sections 2. The member 16 of the hinge comprises a plate 18 secured by screws 19 to the upper side of the rail 3 and the upper end of the column section 6, assuming that the hinge now being described is one of the upper hinges. The end of the plate 18 which overlies the upper end of the column section 6 is formed, as at 20, to register with the edges of the plane faces of the section 6 at the upper end of the said column section, as shown in Figure 3. The said end of the hinge plate 18 is formed with an upward offset to provide a lip 21 overhanging the edge of the plate at its said end, and at the ends of this offset the plate is formed with laterally offset pintle ears 22. Each of the members 17 comprises a plate 23 of a marginal contour to register with the side and end edges of the rail 9 of the respective sections 2, and the said plates are secured by screws 24 to the upper sides of the said respective rails. The plate at its end extends over the upper end of the respective column section 8, and the said end of each plate is formed with a laterally offset ear 25 extending beneath the respective pintle ear 22 of the hinge plate 18, a pintle pin 26 being secured through the overlapping pintle ears and serving to hingedly connect the sections 2 to the ends of the sections 1. From the foregoing, and particularly by reference to Figures 1, 3 and 4 of the drawings, it will be seen that when the end supporting sections 2 are swung to occupy the positions shown in these figures, they will extend in diverging planes from the respective ends of the section 1 and the plane faces of the sections 8 which are remote from the pintle pins 26 will mutually abut, and the other plane faces of said sections 8 will abut the plane faces of the column section 6, thereby completing the column and giving the impression, to the observer, of a solid one-piece cylindrical column, it being understood at this point that the column may, however, be of some other conventional form if found desirable. Likewise, when the sections 2 are positioned as stated, the relatively adjacent edges of the hinge plates 23 will mutually abut, as shown in Figure 3, and the extreme end edges of these plates will abut against the end edge 20 of the plate 18, so that an exceptionally substantial structure is produced. It will also be observed that the lips 21 of the several hinges will overlap the extreme ends of the hinge plates 23, thereby producing a neat finish and rendering the structure more substantial. When the structure is collapsed or folded and the sections 2 are swung to the position shown in Figure 5 of the drawings, the column sections 6 and 8 will be mutually separated, as shown in said figure, as will also the several plates comprising the hinges.

In order that the sections 2, when the structure is set up for use, may be relatively braced so that they will be restrained against swinging to or toward their folded position, a latch 27 is pivotally connected at one end as at 28, to the upper side of the rail 9 of one end section 2 of each pair and is formed at its other end with a notch 29 adapting its said end to be hooked in engagement with a stud 30 provided upon the upper side of the rail 9 of the other section 2 of the pair, as clearly shown in Figures 1 and 7 of the drawings, thereby firmly and securely bracing the sections 2 with relation to each other and preventing any relative displacement thereof. The latch bar 27 serves not only as a means to hold the sections 2 against displacement when the structure is set up for use but it serves also as a means for preventing displacement of the said sections 2 when they are collapsed or folded to extend beside the opposite sides of the main section 1, as shown in Figure 2 of the drawings, the parts being so proportioned that when the structure is collapsed or folded, the said latch bars 27 will, as shown in the said figure, extend transversely across the upper sides of the upper rails 3 and 9 of the sections 1 and 2 and be engaged at their free ends, as before, with the respective studs 30.

In order that a casket, disposed upon the truck, may be supported with its bottom clear of the hinges and the latch bars, as shown in Figure 6, supporting knobs 31 are arranged, preferably, one upon the outer end of each rail 9 and one upon the rail 3 of the section 1 near each end thereof. These knobs may be of cushioning material such, for example, as rubber, or they may be of any other material found suitable for the purpose and while they are illustrated as of sustantially conoidal form, they may be of any other form desired.

In order that the structure may be supported in a manner to permit of its being moved about over a floor surface, swivel casters 32 are mounted upon the hinge plates 18 which are secured to the under sides of the rails 4 of the section 1, and similar casters 33 are arranged at the outer ends of the rails 10 of the sections 2.

From the foregoing description of the invention, it will be seen that there is provided a collapsible truck which may be employed in supporting caskets, cooling boards, or couches, and which truck, in use, will present a neat and inconspicuous appearance and support the casket in such a manner as to prevent any displacement thereof.

Having thus described the invention, what we claim is:

1. A casket truck comprising an upright main supporting section, a pair of end sections hingedly connected with each end of the main section, and a column at the juncture of each pair of end sections and the respective end of the main section comprising a segment fixed at the end of the main section and a segment fixed at the hinged end of each end section, the plane faces of the several component segments of the columns mutually abutting and maintaining the said end sections and the main section in proper relative position when the structure is set up with the end sections extending from the ends of the main section and at an angle to each other.

2. A casket truck comprising an upright main supporting section, a pair of upright end sections at each end of the main section, hinges connecting the end sections with the main section for swinging adjustment, each of the said hinges comprising a plate secured to the main section and having laterally disposed pintle ears, a plate secured to each of the end sections and each having a laterally disposed pintle ear to match the respective pintle ear of the first mentioned plate, and pintle pins connecting the matched ears, the several plates having edge portions arranged to mutually abut when the end sections are adjusted to extend from the ends of the main section and at an angle to each other, and thereby limit the swinging adjustment of the end sections toward each other.

3. A casket truck comprising an upright main supporting section, a pair of upright end sections at each end of the main section, and hinges connecting the end sections with the main section for swinging adjustment, said hinges being located at the upper and lower sides of the main and end sections and comprising plates secured one to the main section and one to each of the end sections, and means pivotally connecting the plates of the end sections to the plates of the main section, the said plates of each hinge having mutually abutting edges to limit the swinging adjustment of the end sections toward each other.

4. A casket truck comprising an upright main supporting section, a pair of upright end sections at each end of the main section, and hinges connecting the end sections with the main section for swinging adjustment, said hinges being located at the upper and lower sides of the main and end sections and each hinge comprising a plate secured to the main section and a plate secured to each of the end sections, means pivotally connecting the end section plates to the main section plate, the main section plate having portions of the length of its end edge extending at an angle to each other, and the pivotally connected ends of the end section plates having edges to abut the said portions of the end edge of the main section plate to limit the swinging adjustment of the end sections toward each other.

5. A casket truck comprising an upright main supporting section, a pair of upright end sections at each end of the main section, and hinges connecting the end sections with the main section for swinging adjustment, said hinges being located at the upper and lower sides of the main and end sections and each hinge comprising a plate secured to the main section and a plate secured to each of the end sections, means pivotally connecting the end section plates to the main section plate, the main section plate having portions of the length of its end edge extending at an angle to each other, and the pivotally connected ends of the end section plates having edges to abut the said portions of the end edge of the main section plate to limit the swinging adjustment of the end sections toward each other, and means extending between the end sections restraining the same from swinging adjustment away from each other.

In testimony whereof we affix our signatures.

GEO. B. MOORE. [L. S.]
HERALD M. ADAMS. [L. S.]